(12) United States Patent
Beck (10) Patent No.: US 10,674,708 B2
(45) Date of Patent: Jun. 9, 2020

(54) ANIMAL BLANKET ASSEMBLY

(71) Applicant: David Beck, Menomonie, WI (US)

(72) Inventor: David Beck, Menomonie, WI (US)

( * ) Notice: Subject to any disclaimer, the term of this patent is extended or adjusted under 35 U.S.C. 154(b) by 249 days.

(21) Appl. No.: 15/802,500

(22) Filed: Nov. 3, 2017

(65) Prior Publication Data

US 2019/0133077 A1    May 9, 2019

(51) Int. Cl.
*A01K 13/00* (2006.01)
*A01M 29/24* (2011.01)

(52) U.S. Cl.
CPC ........... *A01K 13/008* (2013.01); *A01M 29/24* (2013.01)

(58) Field of Classification Search
CPC .... A01K 13/008; A01K 13/006; A01M 29/24
USPC ...................... 119/850; 54/79.1–79.4; 43/112
See application file for complete search history.

(56) References Cited

U.S. PATENT DOCUMENTS

| 3,248,852 | A | * | 5/1966 | Schwartz | A01K 13/006 54/79.1 |
| 4,153,009 | A |   | 5/1979 | Boyle | |
| D265,516 | S |   | 7/1982 | Wacker | |
| 5,158,039 | A | * | 10/1992 | Clark | A01K 15/02 119/712 |
| 5,241,779 | A | * | 9/1993 | Lee | A01M 1/02 43/112 |
| 5,864,292 | A | * | 1/1999 | Roestenberg | A01K 15/02 119/52.3 |
| 5,984,855 | A | * | 11/1999 | DiNapoli | A01K 13/008 600/15 |
| 6,009,693 | A | * | 1/2000 | Hsi-Chang | A01K 13/008 54/79.1 |
| 6,539,898 | B2 |   | 4/2003 | Gatto | |
| 6,786,028 | B1 |   | 9/2004 | Longtin | |
| 6,948,452 | B2 | * | 9/2005 | Wolfgram | A01K 3/005 119/712 |
| 7,191,735 | B2 | * | 3/2007 | Wolfgram | A01K 3/005 119/712 |
| 8,316,626 | B2 |   | 11/2012 | Sherer | |
| 9,795,119 | B2 | * | 10/2017 | Roberson | A01K 13/006 |
| 2003/0061790 | A1 | * | 4/2003 | Longtin | A01K 13/008 54/79.2 |
| 2006/0213156 | A1 |   | 9/2006 | Nilfuroshan | |
| 2008/0067163 | A1 | * | 3/2008 | Axinte | A01K 13/006 219/211 |

(Continued)

FOREIGN PATENT DOCUMENTS

WO    WO2005102341      11/2005
WO    WO-2005104885 A1 * 11/2005 ........... A01K 13/006

*Primary Examiner* — Peter M Poon
*Assistant Examiner* — Danielle A Clerkley (57) ABSTRACT

A horse safety assembly includes a blanket that is draped over an animal. The blanket is comprised of an electrically conductive material. An insulator is coupled to the blanket and the insulator rests on the animal when the blanket is positioned on the animal. The insulator is comprised of an electrically insulating material. A plurality of straps is provided and each of the straps is coupled to the blanket. Each of the straps is selectively matable to each other to retain the blanket on the animal. A shock unit is coupled to the blanket and the shock unit is in electrical communication with the blanket. The shock unit delivers an electrical shock to an attacker when the attacker attacks the animal. In this way the attacker is repelled from the animal.

11 Claims, 6 Drawing Sheets

(56) References Cited

U.S. PATENT DOCUMENTS

| | | | |
|---|---|---|---|
| 2009/0272336 A1* | 11/2009 | Cooke, Jr. | A61D 9/00 |
| | | | 119/850 |
| 2009/0272338 A1* | 11/2009 | Cooke, Jr. | A01K 13/006 |
| | | | 119/850 |
| 2009/0309738 A1* | 12/2009 | Hinkle | A01M 29/24 |
| | | | 340/573.3 |
| 2012/0298052 A1 | 11/2012 | Strauss | |
| 2013/0263561 A1* | 10/2013 | Caston | A01K 13/008 |
| | | | 54/79.2 |

* cited by examiner

ANIMAL BLANKET ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to blanket devices and more particularly pertains to a new blanket device for delivering an electrical shock to an attacker thereby repelling the attacker.

BRIEF SUMMARY OF THE INVENTION

An embodiment of the disclosure meets the needs presented above by generally comprising a blanket that is draped over an animal. The blanket is comprised of an electrically conductive material. An insulator is coupled to the blanket and the insulator rests on the animal when the blanket is positioned on the animal. The insulator is comprised of an electrically insulating material. A plurality of straps is provided and each of the straps is coupled to the blanket. Each of the straps is selectively matable to each other to retain the blanket on the animal. A shock unit is coupled to the blanket and the shock unit is in electrical communication with the blanket. The shock unit delivers an electrical shock to an attacker when the attacker attacks the animal. In this way the attacker is repelled from the animal.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new blanket device embodying the principles and concepts of an embodiment of the disclosure and generally designated by the reference numeral 10 will be described.

As best illustrated in FIGS. 1 through 6, the horse safety assembly 10 generally comprises a blanket 12 that is selectively draped over an animal 14. The animal 14 may be a horse, a donkey, a mule and other four legged animal 14. The blanket 12 is comprised of an electrically conductive material and the blanket 12 is comprised of a fluid impermeable material. The blanket 12 has a first surface 16, a second surface 18 and a peripheral edge 20 extending therebetween. The peripheral edge 20 has a front side 22, a back side 24, a first lateral side 26 and a second lateral side 28.

Each of the first 26 and second 28 lateral sides angles inwardly toward a center of the blanket 12 adjacent to the front side 22 to define a neck portion 30 of the blanket 12 extending away from a body portion 32 of the blanket 12. The first lateral side 26 corresponding to the neck portion 30 is spaced inwardly from the first lateral side 26 corresponding to the body portion 32. The second lateral side 28 corresponding to the neck portion 30 is spaced inwardly from the second lateral side 28 corresponding to the body portion 32. The front side 22 corresponding to the neck portion 30 is spaced forwardly from the front side 22 corresponding to the body portion 32. The body portion 32 is positioned on a body 34 of the animal 14 and the neck portion 30 positioned on a neck 36 of the animal 14.

An insulator 37 is coupled to the blanket 12 and the insulator 37 rests on the animal 14 when the blanket 12 is positioned on the animal 14. The insulator 37 has a primary surface 38 and a secondary surface 40 and the primary surface 38 is coupled to the first surface 16 of the blanket 12. Moreover, the insulator 37 completely covers the first surface 16. The insulator 37 is comprised of an electrically insulating material such as rubber or the like. The secondary surface 40 rests on the animal 14 when the blanket 12 is positioned on the animal 14.

A plurality of straps 42 is provided and each of the straps 42 is coupled to the blanket 12. Each of the straps 42 is selectively matable to each other to retain the blanket 12 on the animal 14. Each of the straps 42 is coupled to and extends away from the peripheral edge 20 of the blanket 12 and each of the straps 42 has a distal end 44 with respect to the peripheral edge 20. The plurality of straps 42 includes a set of first straps 46, a set of second straps 48, a set of third straps 50, a set of fourth straps 52 and a set of fifth straps 54.

Each of the first straps 46 is positioned on the first lateral side 26 of the body portion 32 and each of the second straps 48 is positioned on the second lateral side 28 of the body portion 32. Each the first straps 46 is aligned with an associated one of the second straps 48. The distal end 44 of the first straps 46 is selectively matable to the distal end 44 of the second straps 48. In this way the first 46 and second 48 straps secures the blanket 12 to the animal's body 34.

Each of the third straps 50 is positioned on the front side 22 of the body portion 32 and each of the third straps 50 is positioned on opposite sides of the neck portion 30. The distal end 44 of the third straps 50 is matable together to close the blanket 12 around a chest 51 of the animal 14. Each of the fourth straps 52 is positioned on the back side 24 of the body portion 32. The distal end 44 of each of the fourth straps 52 is matable together to extend across a rump 56 of the animal 14.

Each of the fifth straps 54 is positioned on an associated one of the first 26 and second 28 lateral side of the neck portion 30. The distal end 44 of each of the fifth straps 54 is matable together thereby facilitating each of the fifth straps 54 be wrapped around the animal's neck 36. A plurality of first mating members 56 is provided and each of the first mating members 56 is coupled to the distal end 44 of associated ones of the straps 42. A plurality of second mating members 58 is provided and each of the second mating members 58 is coupled to the distal end 44 of associated ones of the straps 42. Each of the first mating members 56 is matable to corresponding ones of the second mating members 58. Each of the first 56 and second 58 mating members may comprise complementary buckles, clips and hook and loop fasteners.

A shock unit 60 is coupled to the blanket 12 and the shock unit 60 is in electrical communication with the blanket 12. The shock unit 60 selectively delivers an electrical shock to an attacker when the attacker attacks the animal 14. In this way the attacker is repelled from the animal 14. That attacker may be another horse, donkey and mule that is located in proximity to the animal 14 that is wearing the blanket 12. The animal 14 that is wearing the blanket 12 may be a horse that has recently been introduced into a herd of horses or the like. Thus, the horse that has recently been introduced is protected from being bitten and otherwise attacked by other horses in the herd.

The shock unit 60 comprises a housing 61 that is coupled to the second surface 18 of the blanket 12. A conductor 62 is positioned between the first surface 16 and the second surface 18 of the blanket 12 such that the conductor 62 is in electrical communication with the blanket 12. The conductor 62 is arranged to form a plurality of coils 64 within the blanket 12. The coils 64 are spaced apart from each other and are distributed on the body portion 32 and the neck portion 30 of the blanket 12. Moreover, the conductor 62 is electrically coupled to the housing 61.

A power supply 66 is positioned in the housing 61 and the power supply 66 is electrically coupled to the conductor 62. Thus, the power supply 66 delivers an electrical current through the conductor 62. The power supply 66 comprises at least one battery 68 that is positioned in the housing 61 and the at least one battery 68 is electrically coupled to the conductor 62. The shock unit 60 may additionally include a transformer to increase the voltage output of the at least one battery 68. A switch 70 is coupled to the housing 61 and the switch 70 is electrically coupled to the at least one battery 68 to turn the at least one battery 68 on and off.

Figure 1:
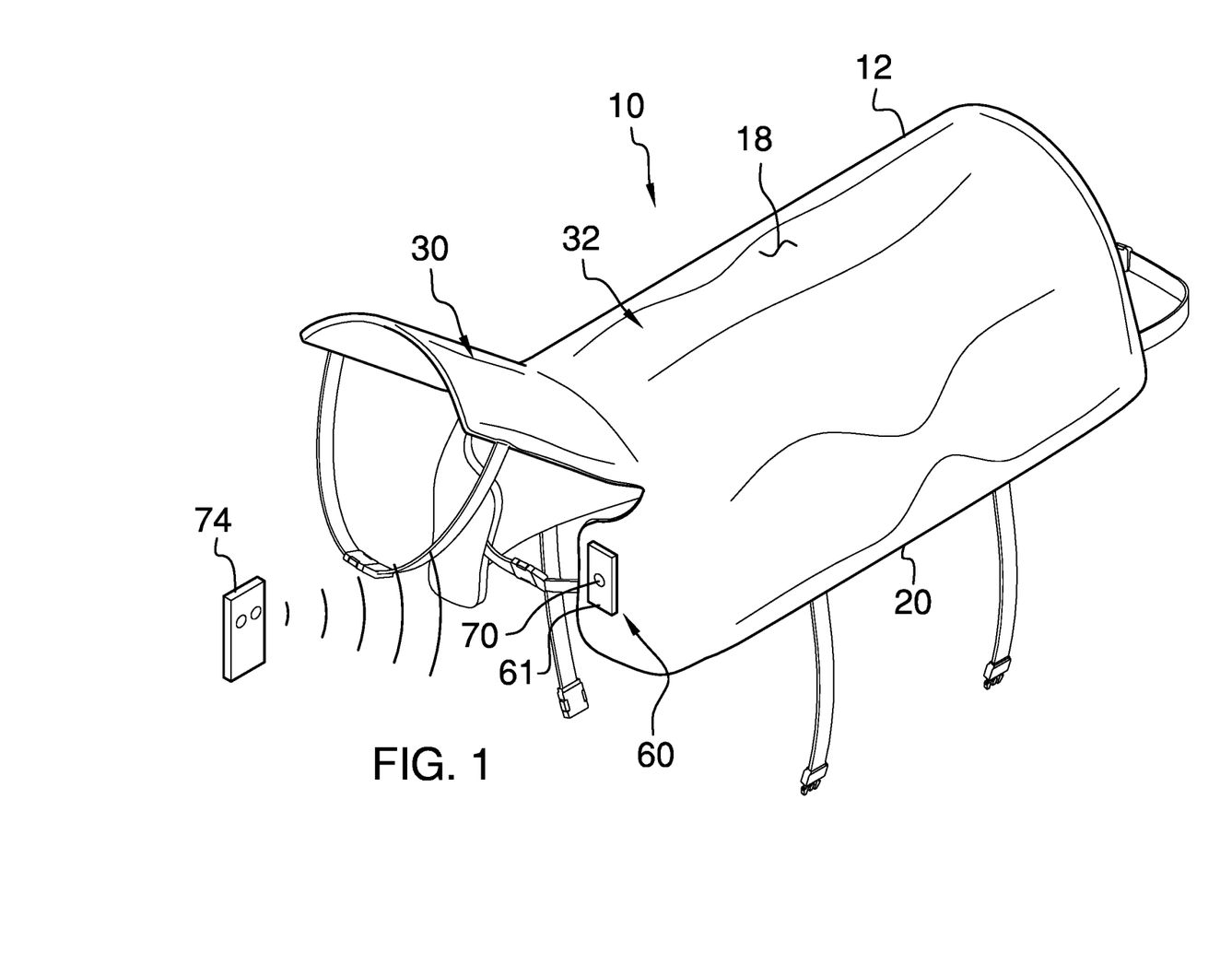
FIG. 1 is a front perspective view of a horse safety assembly according to an embodiment of the disclosure.
Figure 2:
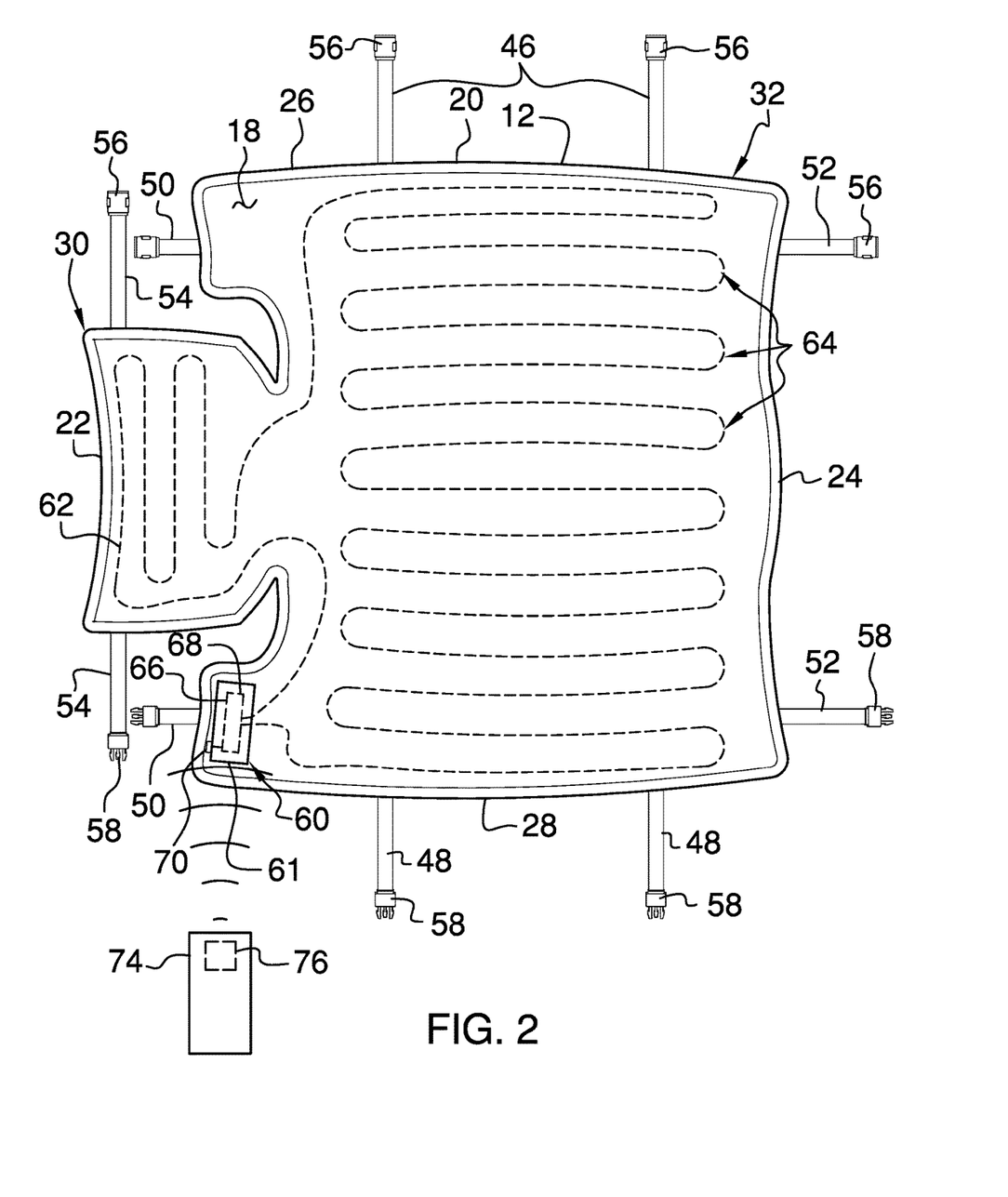
FIG. 2 is a top phantom view of an embodiment of the disclosure.
Figure 3:
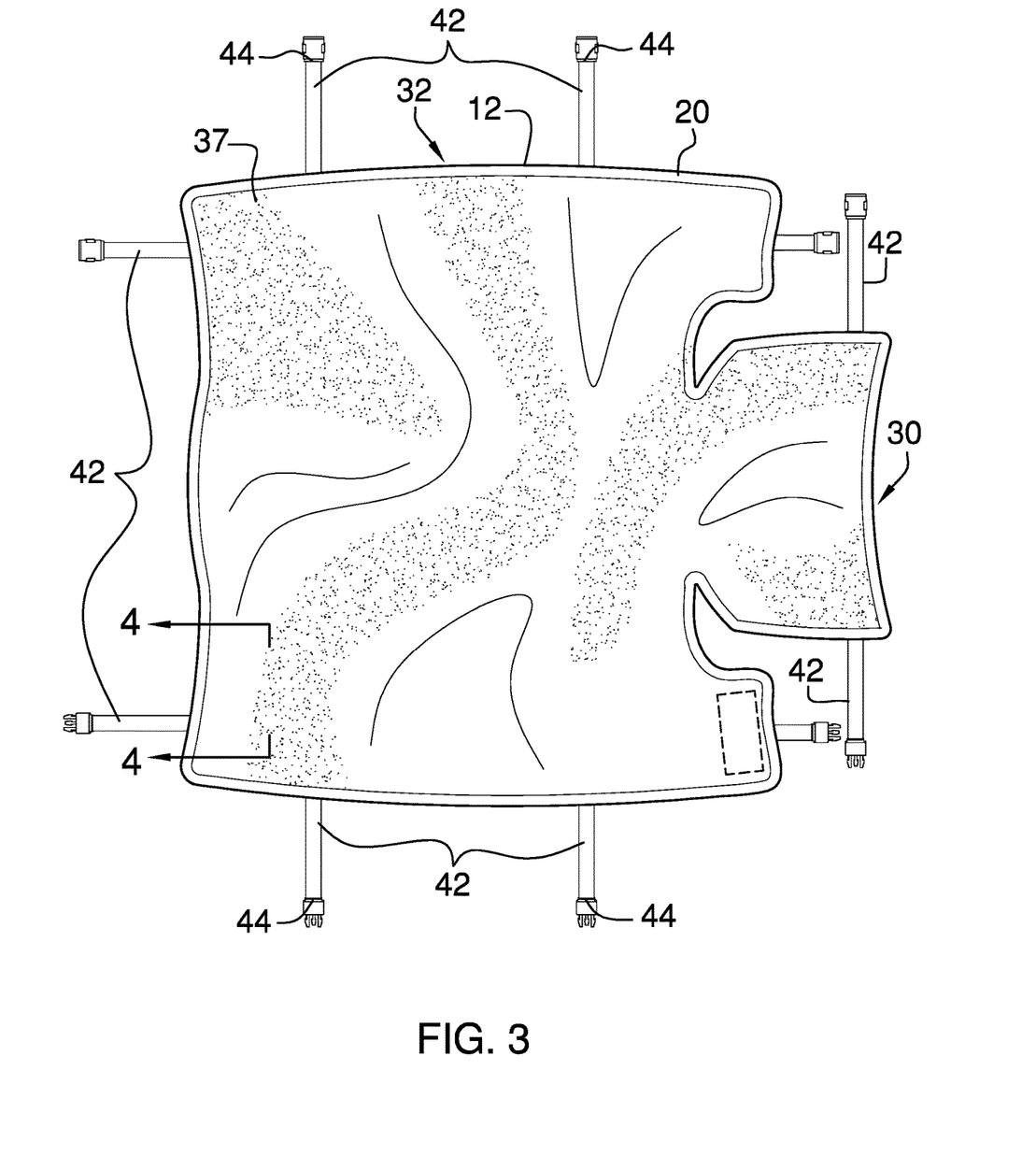
FIG. 3 is a bottom view of an embodiment of the disclosure.
Figure 4:
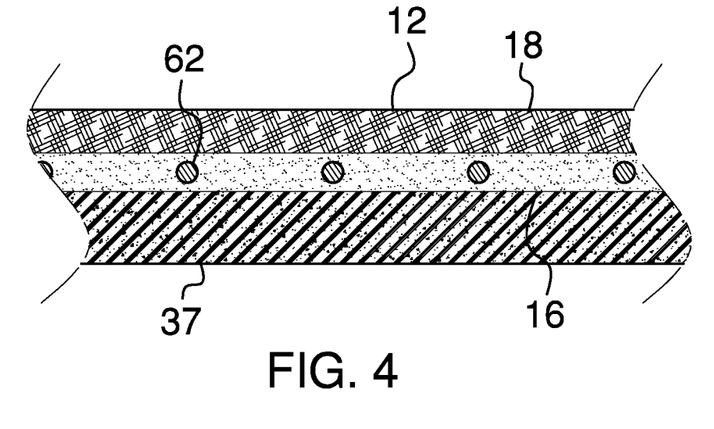
FIG. 4 is a cross sectional view taken along line 4-4 of FIG. 3 of an embodiment of the disclosure.
Figure 5:
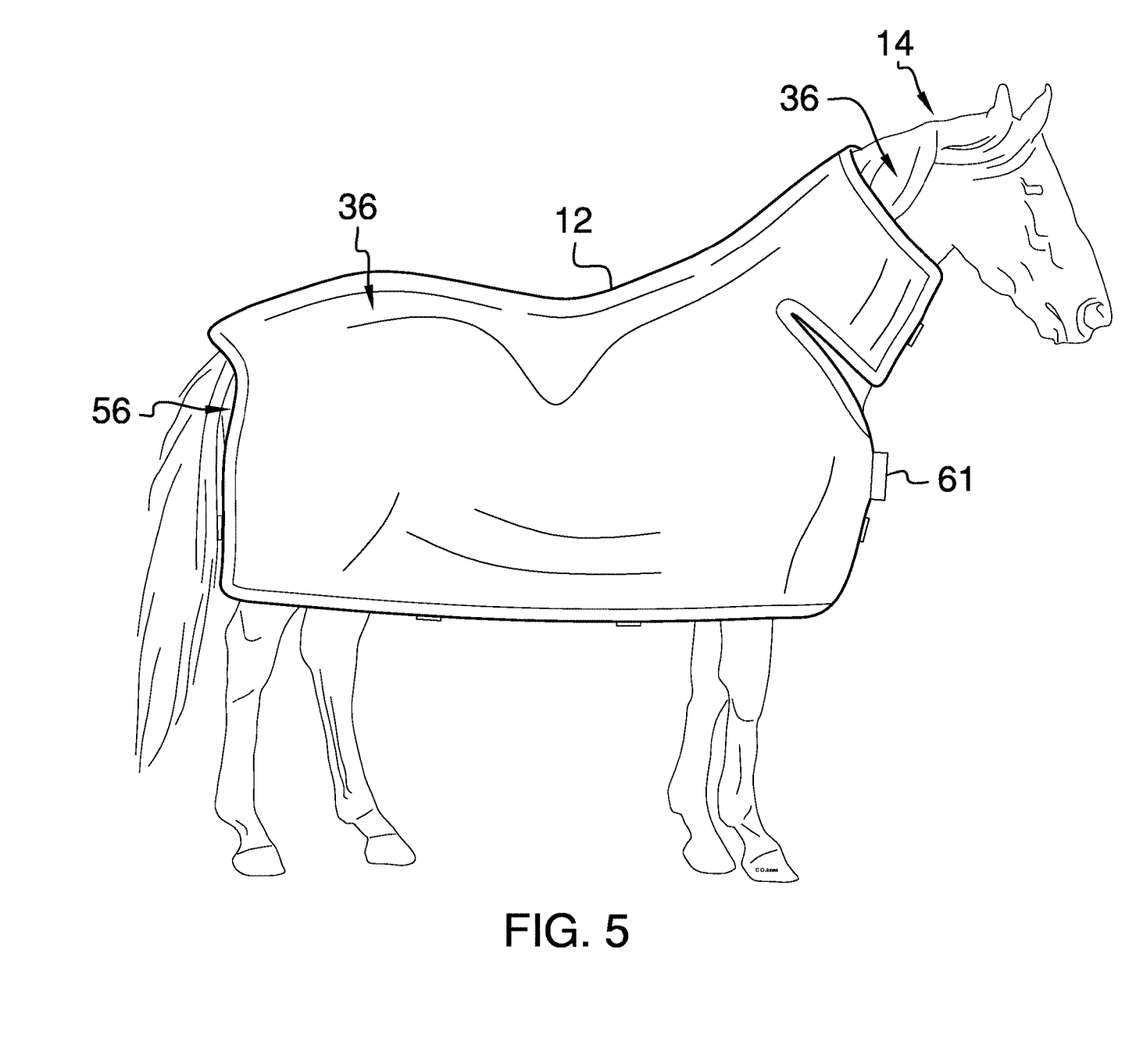
FIG. 5 is a perspective in-use view of an embodiment of the disclosure.
Figure 6:
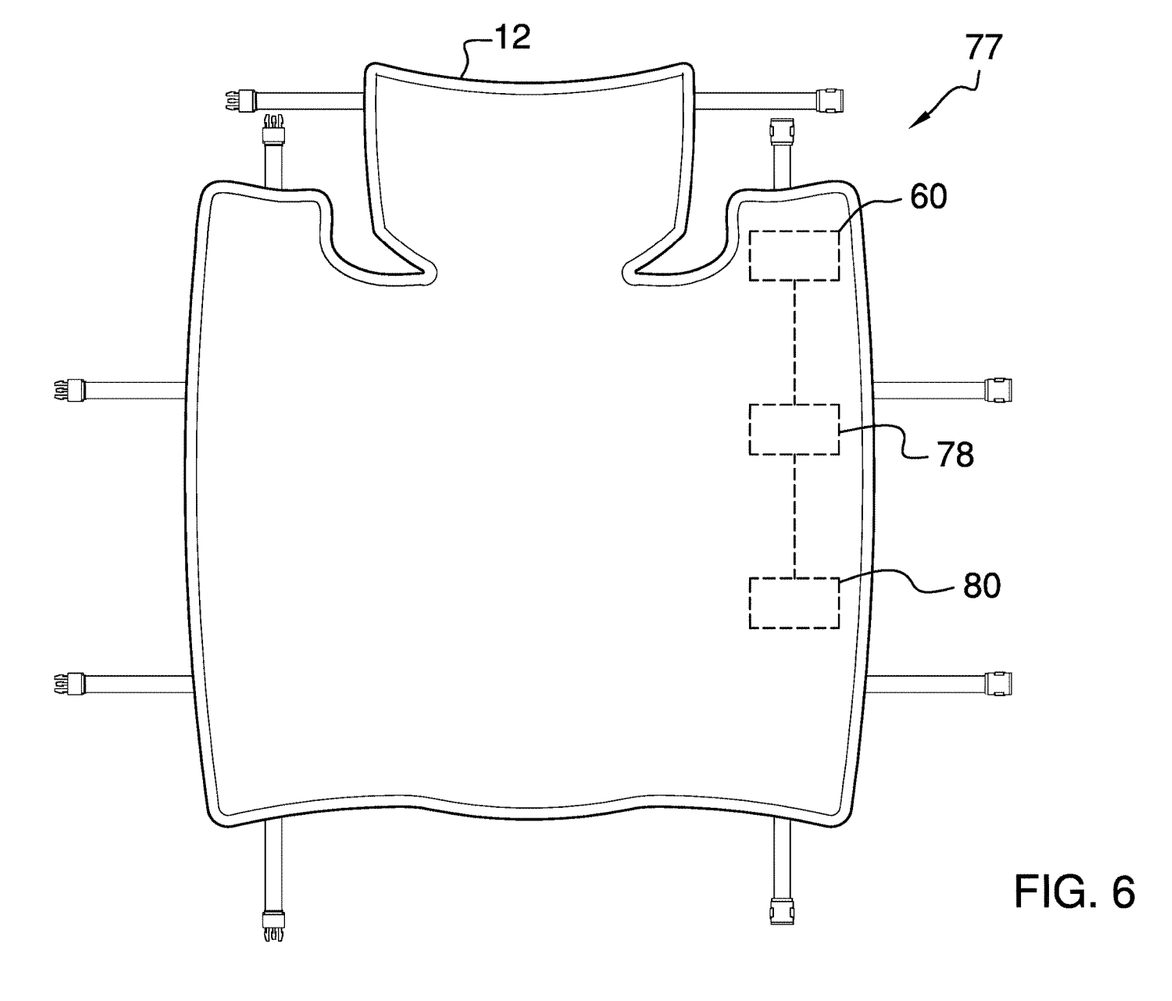
FIG. 6 is a perspective view of an alternative embodiment of the disclosure.

The shock unit 60 may include a receiver 72 and the receiver 72 may be electrically coupled to the power supply. The receiver 72 may be a radio frequency receiver 72 or the like. A remote control 74 may be provided and the remote control 74 may include a transmitter 76. The transmitter 76 may be in wireless communication with the receiver 72. Thus, the remote control 74 may be selectively manipulated to manually turn on the shock unit 60. In an alternative embodiment 77 as shown in FIG. 6, a vibration unit 78 may be included and the vibration unit 78 may vibrate the blanket with the vibration unit 78 is turned on. Thus, the vibration unit 78 frightens the attacker when the attacker engages the blanket. The vibration unit 78 may be electrically coupled to the receiver 72 and the vibration unit 78 may be en electronic vibrator of any conventional design.

In the alternative embodiment as shown in FIG. 6, a speaker 80 may be provided and the speaker 80 may be coupled to the blanket 12. The speaker 80 may emit an audible alarm when the speaker 80 is turned on. Thus, the speaker 80 frightens the attacker when the attacker approaches the blanket. The speaker 80 may be electrically coupled to the receiver 72 and the speaker 80 may be an electronic speaker 80 of any conventional design. The speaker 80 may be selectively turned with the remote control 74 on as a means of negative reinforcement for training the animal. A chest plate may be provided for positioning over the animal's chest and the blanket 12 may be combined for user with other blankets.

In use, the body portion 32 of the blanket 12 is positioned over the animal's body 34 and the neck portion 30 of the blanket 12 is positioned over the animal's neck 36. The insulator 37 rests on the animal 14 when the blanket 12 is positioned on the animal 14. In this way the conductor 62 is inhibited from being in electrical communication with the animal 14. The switch 70 is manipulated to turn the at least one battery 68 on. Thus, the electrical current from the at least one battery 68 is supplied to the conductor 62. The conductor 62 delivers the electrical shock to the attacker when the attacker contacts the blanket 12. In this way the attacker is repelled from attacking the animal 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A horse safety assembly comprising:
a blanket being configured to be draped over an animal, said blanket being comprised of an electrically conductive material, said blanket having a first surface, a second surface and a peripheral edge extending therebetween, said peripheral edge having a front side, a back side, a first lateral side and a second lateral side, each of said first and second lateral sides angling inwardly toward a center of said blanket adjacent to the front side to define a neck portion of said blanket extending away from a body portion of said blanket, said first lateral side corresponding to said neck portion is spaced inwardly from said first lateral side corresponding to said body portion, said second lateral side corresponding to said neck portion being spaced inwardly from said second lateral side corresponding to said body portion, said front side corresponding to said neck portion being spaced forwardly from said front side corresponding to said body portion, said body portion being configured to be positioned on a body of the animal, said neck portion being configured to be positioned on a neck of the animal;
an insulator being coupled to said blanket wherein said insulator is configured to rest on the animal when said blanket is positioned on the animal, said insulator being comprised of an electrically insulating material;
a plurality of straps, each of said straps being coupled to said blanket, each of said straps being selectively matable to each other to retain said blanket on the animal; and
a shock unit being coupled to said blanket, said shock unit being in electrical communication with said blanket wherein said shock unit is configured to deliver an electrical shock to an attacker when the attacker attacks the animal thereby facilitating the attacker to be repelled from the animal, said shock unit comprising
a housing being coupled to said second surface of said blanket, and
a conductor being positioned between said first surface and said second surface of said blanket such that said conductor is in electrical communication with said blanket, said conductor being arranged to form a plurality of coils within said blanket, said coils being spaced apart from each other and being distributed on said body portion in a wave pattern extending across said body portion between said first lateral side of said body portion and said second lateral side of said body portion and across said neck portion of said blanket extending from said first side towards said body portion of said blanket, said conductor being electrically coupled to said housing.

2. The assembly according to claim 1, wherein said insulator has a primary surface and a secondary surface, said primary surface being coupled to said first surface of said blanket having said insulator completely covering said first surface, said secondary surface being configured to rest on the animal when said blanket is positioned on the animal.

3. The assembly according to claim 1, wherein each of said straps is coupled to and extends away from said peripheral edge of said blanket, each of said straps having a distal end with respect to said peripheral edge, said plurality of straps including a set of first straps, a set of second straps, a set of third straps a set of fourth straps and a set of fifth straps.

4. The assembly according to claim 3, wherein each of said first straps is positioned on said first lateral side of said body portion, each of said second straps being positioned on said second lateral side of said body portion, said distal end of said first straps being selectively matable to said distal end of said second straps wherein said first and second straps are configured to secure said blanket to the animal's body.

5. The assembly according to claim 3, wherein each of said third straps is positioned on said front side of said body portion, said distal end of said third straps being matable together wherein said third straps is configured to close said blanket around a chest of the animal.

6. The assembly according to claim 3, wherein each of said fourth straps is positioned on said back side of said body portion, said distal end of each of said fourth straps being matable together wherein each fourth straps are configured to extend across a rump of the animal.

7. The assembly according to claim 3, wherein each of said fifth straps is positioned on an associated one of said first and second lateral side of said neck portion, said distal end of each of said fifth straps being matable together wherein each of said fifth straps is configured to be wrapped around the animal's neck.

8. The assembly according to claim 1, further comprising a power supply being positioned in said housing, said power supply being electrically coupled to said conductor such that said power supply delivers an electrical current through said conductor.

9. The assembly according to claim 8, wherein said power supply comprises at least one battery being positioned in said housing, said at least one battery being electrically coupled to said conductor.

10. The assembly according to claim 9, further comprising a switch being coupled to said housing wherein said switch is configured to be manipulated, said switch being electrically coupled to said at least one battery such that said switch turns said at least one battery on and off.

11. A horse safety assembly being configured to selectively deliver an electric shock to an attacker thereby deterring the attacker from attacking an animal, said assembly comprising:
a blanket being configured to be draped over an animal, said blanket being comprised of an electrically conductive material, said blanket having a first surface, a second surface and a peripheral edge extending therebetween, said peripheral edge having a front side, a back side, a first lateral side and a second lateral side, each of said first and second lateral sides angling inwardly toward a center of said blanket adjacent to the front side to define a neck portion of said blanket extending away from a body portion of said blanket, said first lateral side corresponding to said neck portion being spaced inwardly from said first lateral side corresponding to said body portion, said second lateral side corresponding to said neck portion being spaced inwardly from said second lateral side corresponding to said body portion, said front side corresponding to said neck portion being spaced forwardly from said front side corresponding to said body portion, said body portion being configured to be positioned on a body of the animal, said neck portion being configured to be positioned on a neck of the animal, said blanket being comprised of a fluid impermeable material;

an insulator being coupled to said blanket wherein said insulator is configured to rest on the animal when said blanket is positioned on the animal, said insulator having a primary surface and a secondary surface, said primary surface being coupled to said first surface of said blanket having said insulator completely covering said first surface, said insulator being comprised of an electrically insulating material, said secondary surface being configured to rest on the animal when said blanket is positioned on the animal;

a plurality of straps, each of said straps being coupled to said blanket, each of said straps being selectively matable to each other to retain said blanket on the animal, each of said straps being coupled to and extending away from said peripheral edge of said blanket, each of said straps having a distal end with respect to said peripheral edge, said plurality of straps including a set of first straps, a set of second straps, a set of third straps a set of fourth straps and a set of fifth straps, each of said first straps being positioned on said first lateral side of said body portion, each of said second straps being positioned on said second lateral side of said body portion, said distal end of said first straps being selectively matable to said distal end of said second straps wherein said first and second straps are configured to secure said blanket to the animal's body, each of said third straps being positioned on said front side of said body portion, said distal end of said third straps being matable together wherein said third straps is configured to close said blanket around a chest of the animal, each of said fourth straps being positioned on said back side of said body portion, said distal end of each of said fourth straps being matable together wherein each fourth straps are configured to extend across a rump of the animal, each of said fifth straps being positioned on an associated one of said first and second lateral side of said neck portion, said distal end of each of said fifth straps being matable together wherein each of said fifth straps is configured to be wrapped around the animal's neck; and a shock unit being coupled to said blanket, said shock unit being in electrical communication with said blanket wherein said shock unit is configured to deliver an electrical shock to an attacker when the attacker attacks the animal thereby facilitating the attacker to be repelled from the animal, said shock unit comprising:

a housing being coupled to said second surface of said blanket, a conductor being positioned between said first surface and said second surface of said blanket such that said conductor is in electrical communication with said blanket, said conductor being arranged to form a plurality of coils within said blanket, said coils being spaced apart from each other and being distributed on said body portion in a wave pattern extending across said body portion between said first lateral side of said body portion and said second lateral side of said body portion and across said neck portion of said blanket extending from said first side towards said body portion of said blanket, said conductor being electrically coupled to said housing, a power supply being positioned in said housing, said power supply being electrically coupled to said conductor such that said power supply delivers an electrical current through said conductor, said power supply comprising:

at least one battery being positioned in said housing, said at least one battery being electrically coupled to said conductor, and a switch being coupled to said housing wherein said switch is configured to be manipulated, said switch being electrically coupled to said at least one battery such that said switch turns said at least one battery on and off.

* * * * *